Dec. 19, 1972    J. BECHER ET AL    3,706,537
FREE RADICAL pH INDICATORS
Filed Feb. 22, 1971    2 Sheets-Sheet 1
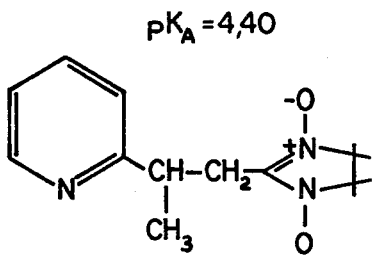
FIG_1
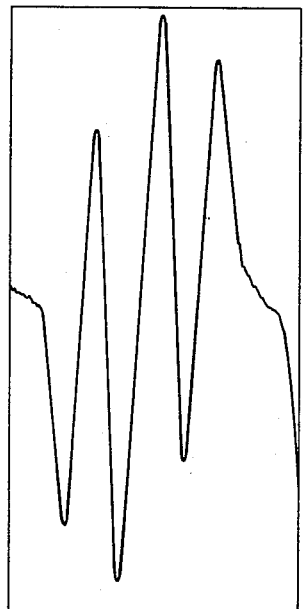
pH 2,24
FIG_2
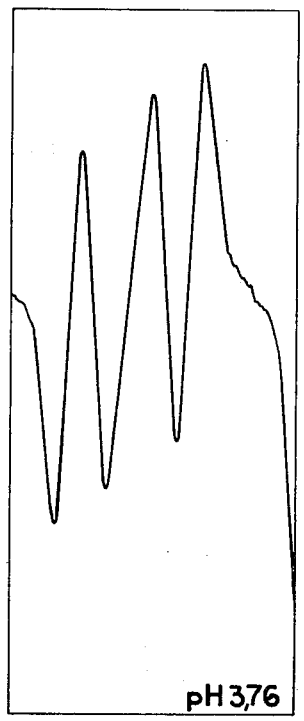
pH 3,76
FIG_3
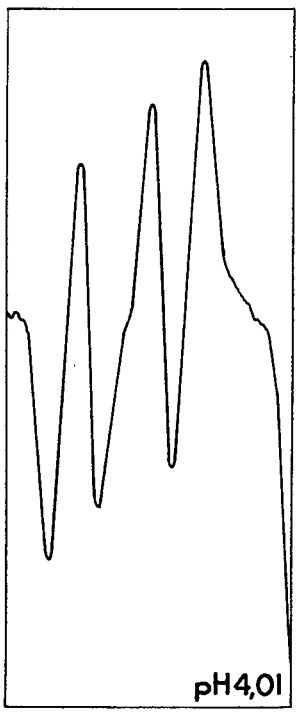
pH 4,01
FIG_4
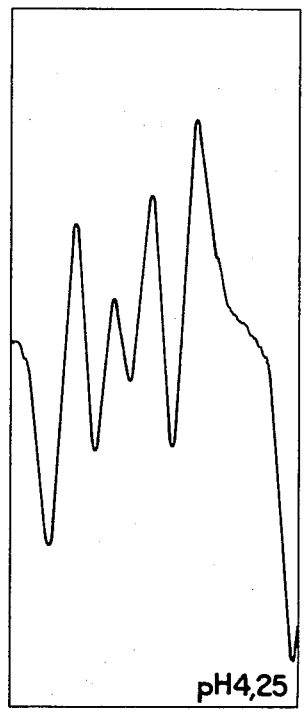
pH 4,25
FIG_5
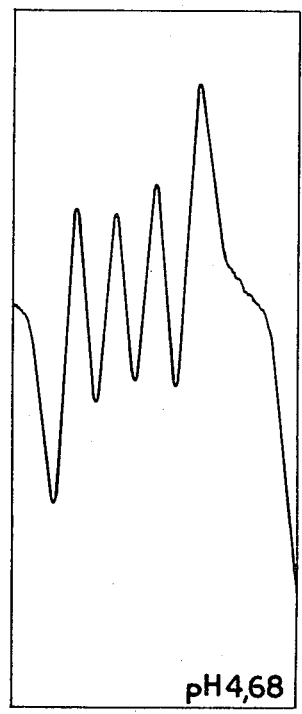
pH 4,68
FIG_6
INVENTORS
EDWIN F. ULLMAN
JAN BECHER
BY
*Townsend and Townsend*
ATTORNEYS

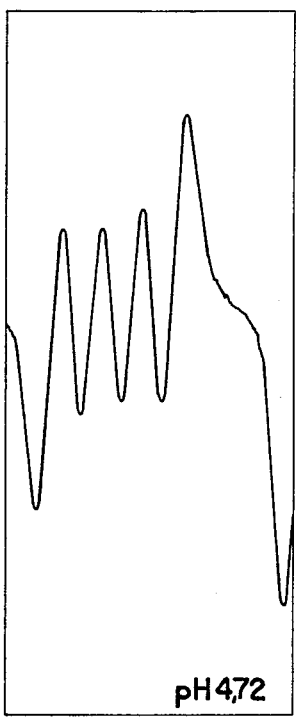
pH 4,72
FIG_7
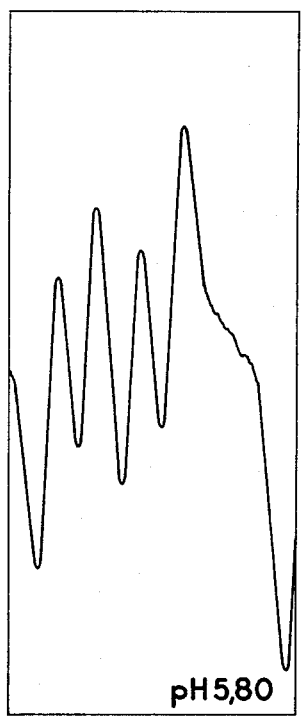
pH 5,80
FIG_8
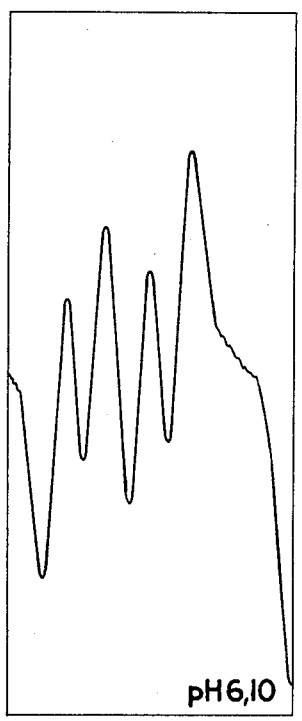
pH 6,10
FIG_9
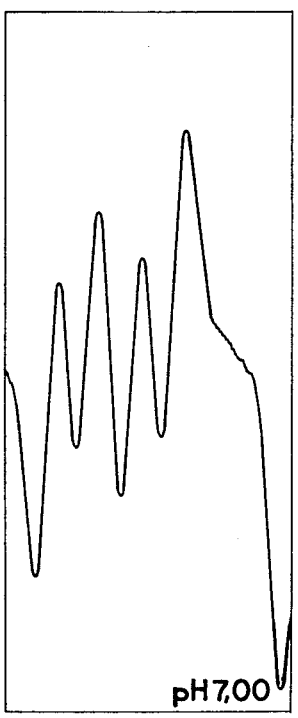
pH 7,00
FIG_10
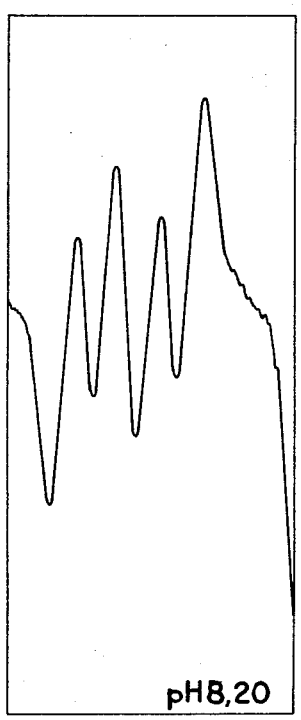
pH 8,20
FIG_11
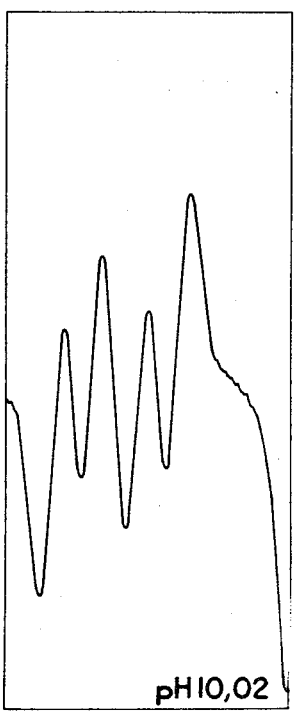
pH 10,02
FIG_12

United States Patent Office 3,706,537
Patented Dec. 19, 1972

3,706,537
FREE RADICAL pH INDICATORS
Jan Becher, Grindlose, Denmark, and Edwin F. Ullman, Atherton, Calif., assignors to Synvar Associates, Palo Alto, Calif.
Continuation-in-part of abandoned application Ser. No. 794,008, Jan. 27, 1969. This application Feb. 22, 1971, Ser. No. 117,669
Int. Cl. G01n 21/08, 33/16
U.S. Cl. 23—230 R          5 Claims

ABSTRACT OF THE DISCLOSURE

Acidity determinations are made from variations in electron spin resonance (ESR) spectra with compounds having an asymmetric center bonded through a methylene group to an organic functionality having an unpaired electron. Accurate determination of acidity can be made by comparing the spectrum of the sample being measured to a standard.

CROSS-REFERENCES TO A LATER APPLICATION

This application is a continuation-in-part of application Ser. No. 794,008, filed Jan. 27, 1969, now abandoned.

BACKGROUND OF THE INVENTION

Field of the invention

The determination of acidity is important in numerous systems. In processing, the acidity of the medium may be essential to the yield of the product, the course of the reaction or the determination of the degree to which the reaction has occurred. In many instances, materials are present which will interfere with an electro-chemical determination of the acidity of the system.

ESR spectrometry can be employed with opaque solutions, where optical methods cannot be employed. In addition, free radical compounds can be employed in situations where it might be difficult or otherwise impossible to introduce a probe to determine the acidity of the system. For example, appropriately substituted compounds could be introduced into individual cells and measurements made on the cells, without destruction of the cell.

Description of the prior art

Co-pending application Ser. No. 696,718, now abandoned, discloses tetra-substituted imidazolidinyl-1-oxyl-3-oxide compounds which are stable free radicals, having a wide variety of substituents at the 2 position of the ring. Co-pending application Ser. No. 752,744, filed Aug. 15, 1968, discloses tetra-substituted imidazolidinyl-1-oxyl compounds which are also stable free radicals. These compounds have been taught to be useful as spin labels and as standards for ESR spectrums.

BRIEF DESCRIPTION OF THE VIEWS OF THE DRAWING

In the accompanying drawings:

FIG. 1 represents the structural formula of a typical new radical of this invention.

FIGS. 2–12 are one of five equivalent major lines in the ESR spectra of the molecule of FIG. 1 at various pH levels.

DETAILED DESCRIPTION

Compounds are provided which permit acidity determinations by measuring variations in electron spin resonance spectra. The salient features of the subject invention are the presence of (1) a center which changes its degree of asymmetry by the loss or gain of a proton which is (2) bonded to a methylenic group, which is (3) bonded to a functionality having an unpaired electron.

The compounds of this invention are primarily α-nitronyl nitroxides or α-imino nitroxides having a methylene (—CH$_2$—) group bonded to the carbon atom intermediate the two nitrogen atoms. To the other valence of the methylene is a group which with change in acidity (basicity) undergoes a change in symmetry. That is, the methylene and the three groups provide a center, which loses, gains or changes the asymmetry about the central carbon atom. Since the unpaired electron resonates between the various atoms of the nitronyl nitroxide and imino nitroxide, the electron spin resonance spectrum of the molecule is influenced by the fields of the two protons of the methylene group. By affecting the equivalence of the two protons by the presence of an asymmetric center, changes in the electron spin resonance spectrum can be observed.

The subject compounds have the nitrogen atoms bonded to carbon atoms which are bonded to three other carbon atoms, preferably so as to form a five membered ring which is disubstituted in both the 4 and 5 positions.

Preferably, the compositions of this invention will have a rigid ring structure of the following formula:

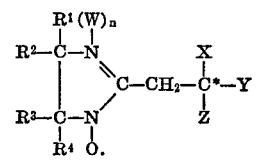

wherein $R^1$–$R^4$ are organic radicals, preferably hydrocarbon radicals, of from 1 to 20 carbon atoms, more usually from 1 to 12 carbon atoms, which may be aliphatic, alicyclic, both either saturated or aliphatically unsaturated, i.e., ethylenic or acetylenic, usually not more than one site of unsaturation, aromatic, or combination thereof, and are bonded to the carbon atoms of the ring through carbon.

The $R^1$–$R^4$ may be the same or different, but because of preparative convenience, $R^1$–$R^2$ will usually be the same as $R^3$–$R^4$. Furthermore, two of the $R^1$–$R^4$ may be taken together to form a ring, usually of from 5 to 7 carbon atoms. If $R^1$–$R^2$ is taken together, a ring spiro to the imidazolidine ring will be obtained. If $R^2$ and $R^3$ are taken together, a ring fused to the imidazolidine ring will be obtained. The sole significant factor concerning $R^1$–$R^4$ are that they are organic radicals bonded to the ring carbon atoms through carbon.

W is oxide (—O), $n$ is an integer of from 0 to 1, with the proviso that when $n$ is 1 the nitrogen atom to which W is bonded is positive, and X, Y and Z represent at least two separate groups, usually hydrogen, organic or an organic functionality, at least one of which has or at least one is an acidic or basic substituent, which gains or loses a proton with change in acidity of the medium into which it is introduced; X, Y and Z being selected so that the degree of asymmetry about C* changes with the gain or loss of a proton by said acidic or basic group.

When $n$ is 0, the compounds will have the following formula:

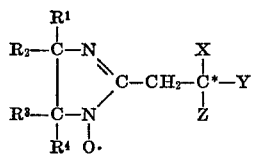

wherein all of the symbols are defined previously.

When $n$ is 1, the compounds will have the following formula:

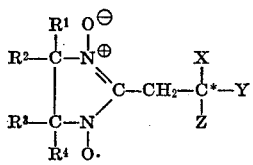

wherein all of the symbols have been defined previously.

Preferred compositions are those having $R^1-R^4$ alkyl, aryl hydrocarbon or aralkyl of from 1 to 12 carbon atoms, more preferably alkyl from 1 to 6 carbon atoms, and particularly prepared methyl or ethyl.

The total number of carbon atoms in the molecule, will usually not exceed 100 carbon atoms and more usually not exceed 60 carbon atoms, preferably being of from about 10 to 50 carbon atoms.

As already indicated, the significant features concerning X, Y and Z are that the degree of asymmetry about C* varies with change in acidity. It is found that the farther one removes the site which gains or loses the proton from the methylenic group the greater the spectral changes in the ESR are attenuated. However, if the geometry is such, that the acidic or basic group is within approximately 6 A., there will be sufficient change in the spectrum to permit an accurate measurement. Accordingly, all substituents are contemplated on the beta carbon atom in which at least one of the atoms which gains or loses a proton with change in acidity is capable of approaching to within 6 A. of the methylenic group (alpha carbon atom) or the unpaired electron containing functionality, i.e., nitronyl nitroxide or imino nitroxide.

Usually the substituents on the beta carbon atom and particularly those containing the acidic or basic entity which donates or loses a proton, should be attached to relatively short molecular chains. For example, this is borne out in the formula given above, if Y is hydrogen and X is methyl; the observable ESR spectral changes are attenuated in the series in which Z is COOH, CH$_2$COOH, CH$_3$CH$_2$COOH, etc.

However, the length of the chain to which the acidic or basic centers are attached is not controlling in all cases. Special steric effects in rigid groups can serve to bring the active center spatially near the nitronyl nitroxide group despite the fact that the acidic or basic group is many atoms removed. For example, a substituent on the beta carbon atom such as:

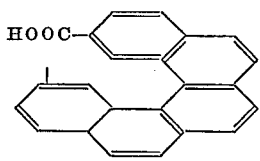

would provide the desired changes in asymmetry that is observable by ESR spectroscopy sufficiently for present purposes. The groups bonded to the beta carbon atom are therefore not strictly limited by molecular size but only by spatial atomic orientation.

In addition, the gorups X, Y and Z may be bonded together to form rings where the asymmetric center is the bridge head carbon in a bicyclic ring or otherwise, an annular carbon atom. In this situation also, the degree of asymmetry must change with a gain or loss of a proton.

With the above spatial and symmetry requirement the only other requirement for the substituents on the beta carbon atom is the presence of at least one acidic or basic group. Any group capable of gaining or losing a proton in acidic or basic media is contemplated. Typical acidic groups include phenols, carboxylic acids, barbituric acids, —SO$_3$H, —OSO$_3$H, —PO$_3$H$_2$, OPO$_3$H$_2$, —SO$_2$H, —OPO$_2$H,

—CH(NH$_2$)COOH and the like. Typical basic groups include amines, heterocyclic bases such as pyridine and quinoline, amidines —C(=NH)NH$_2$, quinolines,

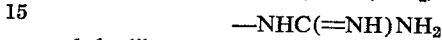

and the like.

The nature of the groups on the beta carbon atom, aside from the necessary basic or acidic entity, may be as diverse as desired. Preferably these groups should be as different from one another as possible both with respect to size and to polarity. The groups may be aliphatic or aromatic and may contain any functional groups. Only the change in asymmetry about the beta carbon atom with the gain or los of proton is critical with regard to this portion of the total free radical molecule.

Preferred compounds will have X equal to hydrogen or lower alkyl; Y will be hydrocarbon or heterohydrocarbon having from 0 to 3 heteroatoms e.g. sulfur, oxygen, nitrogen, halogen, etc., will be different from X and usually of from 1 to 20 carbon atoms; Z will have the basic or acidic functionality and will be from 0 to 20 carbon atoms.

Alternatively, Y and Z may be taken together to form a ring of from 5 to 7 annular members, which have 1 to 3 heteroannular members e.g. oxygen or nitrogen, whereby the degree of asymmetry changes with the loss or gain of a proton.

In referring to the measuring of acidity, it is also intended to include measurements of basicity. That is, depending upon the compounds employed in this invention, the degree to which a compound accepts or donates a proton in a particular medium from or to the free radical compounds employed in the subject invention can be related to extrinsic standards.

For the most part, the compounds of this invention will be used in aqueous, or partially aqueous solution. In that instance, pH will be the measurement of acidity or basicity. However, other media may be used, such as pure solvents and mixed solvents. Because of solubility, the solvents will normally be polar or polarizable. Illustrative solvents include water; alcohols, such as methanol, propanol, hexanol; ethers, such as dioxane, diethyl ether, anisole; ketones, such as acetone, butanone, acetophenone; non-oxygenated compounds, such as benzene, chloroform, chlorobenzene and miscellaneous solvents such as nitrobenzene, dimethylformamide, hexamethyl phosphoramide, acetonitrile, dimethyl sulfoxides, etc. In non-aqueous solvents, the acidity or basicity is not properly referred to as pH, but rather is more related to the ability of the solvent to accept or donate a proton.

The change in spectrum is to a significant degree based on the change in solvation of the group which gains or loses a proton. Preferred media, therefore, will be those which provide strong solvation of the charge. These are normally hydroxylic media, such as water and the alcohols.

The change in spectrum will be most pronounced where there is the greatest change in concentration differential between the protonated and unprotonated species. That is, the pK of the radical compound should be such that a substantial amount of the compound should be in both the protonated and unprotonated form. Usually, both of the forms should be present in at least 5 molar percent and preferably at at least 10 molar percent.

The spectral changes observed with change in symmetry about the beta carbon atom will vary with the particular radical being used and the environment being analyzed. With the nitronyl nitroxide, generally, the changes in the spectrum are from five groups of three lines each to five groups of four lines each. With the imino nitroxide, the change in the spectra will vary depending upon whether the imino nitrogen becomes protonated. The imino nitroxide will have a more complex spectrum than the nitronyl nitroxide depending on the groups associated with the unpaired electron and the medium being measured.

In some cases a change may not be complete. For example, the three line groups may change only by broadening of the center line or the four line groups may change only by partial shifting of the two center lines toward each other. Those radicals which give a pronounced and complete change will usually be more desirable, where the most accurate and precise determinations are desired.

The accuracy of the determination will be solely dependent on the degree of change in the ESR spectrum with the gain or loss of a proton by the free radical compound. Since, at the equivalence point half of the free radical compound will be in the protonated form and half will be in the unprotonated form, the spectrum, which normally will be taken near the equivalence point, will be a composite of the neutral and ionic forms. Since extrinsic standards will be employed for the determination of pH, it is only necessary that the change in the ESR spectrum vary in a smooth way with the change in the acidity or basicity of the medium.

The compositions of this invention are readily prepared employing an aldehyde having the appropriate asymmetric center in the beta position and a 1,1,2,2-tetrasubstituted 1,2-bis-hydroxylaminoethane. The substituents at the 1 and the 2 position are those which have been described previously as $R^1$–$R^4$. The resulting 1,3-dihydroxydiazole may be used to form the nitronyl nitroxide or the imino nitroxide by appropriate methods. See co-pending applications, Ser. Nos. 740,055 filed June 26, 1968, and 752,744 filed Aug. 15, 1968.

The following examples illustrate the preparation of typical compounds of the present invention. In the structural formulae, the symbol

is used to indicate the group.

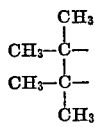

The first illustration utilizes a scheme of synthesis as follows:

SCHEME A

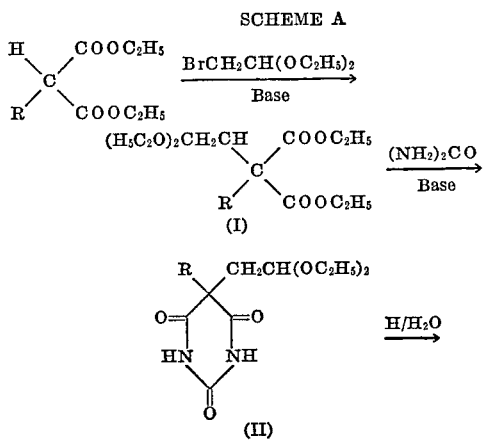

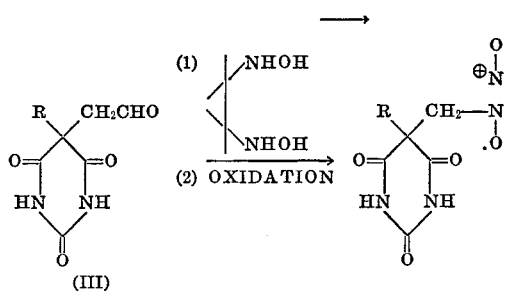

Three compounds (IVa, IVb, IVc) of this invention are obtained by the above synthesis in which the substituent R of the product IV has the following meaning (corresponding intermediates are similarly identified by the letters a, b, and c):

IVa: R=CH$_3$
IVb: R=C$_2$H$_5$
IVc: R=CH(CH$_3$)(CH$_2$)$_2$CH$_3$ 5-methyl-5-(formylmethyl)-barbituric acid IIIa (All temperatures here and throughout this specification are in centigrade.)

The malonic ester Ia (10.0 g., 0.0345 mol) and urea (2.63 g., 0.0438 mol) were added to a solution of sodium (1.83 g., 0.0794 mol) in 48.5 ml. dry ethanol. The solution was gradually concentrated to 12 ml. by slow distillation over 2 hours and then heated at 85° for 4 hours, followed by stirring at room temperature for 12 hours. The semicrystalline reaction mixture was then cooled to 10° and 39 ml. ice cold water was added. The water solution was extracted with benzene (2× 14 ml.), the combined benzene extracts washed with a little water and the combined water phase was acidified with 8 N HCl. After stirring some time at 5°, 5.7 g. (64%) of 5-methyl-5-(formylmethyl)-barbituric acid diethyl acetal IIa had precipitated. A sample recrystallized from benzene melted at 100–110°.

The acetal IIa (1.90 g., 0.00736 mol) was refluxed for 1 hour in 23 ml. of 0.067 N HCl and then cooled with stirring to 0°. The precipitated white crystals were washed with a little ice cold water and recrystallized from ethanol to give 0.87 g. (65%) of 5-methyl-5-(formylmethyl)-barbituric acid IIIa, M.P. 247–249° d.

Analysis.—Calcd. for C$_7$H$_8$N$_2$O$_4$ (percent): C, 45.65; H, 4.38; N, 15.21. Found (percent): C, 45.56; H, 4.49; N, 15.38.

5-methyl-5-(1,3-dioxy-4,4,5,5-tetramethyl-4,5-dihydro-2-imidazomethyl)-barbituric acid IVa The aldehyde IIIa (0.5 g., 0.0027 mol) was mixed with 2,3-bis-hydroxylamino-2,3-dimethylbutane (0.41 g., 0.0028 mol) in 20 ml. absolute ethanol. The solution was stirred at room temperature for 3½ hours. Then 5.0 g. lead dioxide was added and stirring continued for 10 min. The drop red reaction mixture was filtered through Celite, evaporated in vacuo and the residue chromatographed on silica with a 9:1 mixture of chloroform-methanol. The main red band yielded 0.22 g. (26%) of the barbituric acid radical IVa. A sample (0.22 g.) recrystallized from methanol-ether gave deep red needles (0.15 g.), M.P. 213–216° d.

Analysis.—Calcd. for C$_{13}$H$_{19}$N$_4$O$_5$ (percent): C, 50.1; H, 6.1; N, 18.0. Found (percent): H, 50.26; H, 5.97; N, 17.96.

5-ethyl-5-(formylmethyl)-barbituric acid IIIb

The malonic ester Ib (8.0 g., 0.029 mol) and urea (2.21 g., 0.037 mol) were added to a solution of sodium (1.53 g., 0.067 mol) in 41 ml. of dry ethanol under nitrogen. 33 ml. of ethanol was then distilled off over 5 hours at which time the temperature of the reaction mixture was 86°. The remaining reaction mixture was cooled to 10° and diluted with 24 ml. of ice cold water.

The water solution was extracted with benzene (2× 12 ml.) and the combined benzene extracts washed with a little water. The combined water phase was brought to pH=3.1 by adding 8 N HCl. White crystals precipitated after stirring some time with ice cooling.

Yield: 5.8 g. (74%) of the acetal IIb, M.P. 146–149° d.

The acetal IIb (5.0 g., 0.021 mol) was refluxed for 1 hour in 60 ml. 0.067 N HCl and then cooled to 0° with stirring. The precipitated white crystals were filtered, washed with a little ice cold water and dried to give 3.0 g. (74%) of the aldehyde IIIb, M.P. 256–259° d. A sample recrystallized from 0.1 N HCl had M.P. 256–258° d., colorless needles.

*Analysis.*—Calcd. for $C_8H_{10}N_2O_4$ (percent): C, 48.48; H, 5.09; N, 14.14. Found (percent): C, 48.28; H, 5.17; N, 14.30.

5-ethyl-5-(1,3-dioxy-4,4,5,5-tetramethyl-4,5-dihydro-2-imidazomethyl)-barbituric acid IVb The aldehyde IIIb (0.119 g., $0.6 \times 10^{-3}$ mol) in 5.0 ml. absolute ethanol was mixed with 2,3-bis-hydroxylamino-2,3-dimethylbutane (0.089 g., $0.6 \times 10^{-3}$ mol) in 5.0 ml. benzene and stirred for 4½ hours at room temperature after which time all the starting material had dissolved. Then 2.0 g. lead dioxide was added and stirring continued for another ½ hour. The deep red reaction mixture was filtered over Celite, evaporated in vacuo and the residue chromatographed on silica with a 10:1 mixture of chloroform-methanol. The main red band yielded on evaporation in vacuo 0.128 g. (66%) of the barbituric acid radical IVb. A sample was recrystallized from chloroform-ether, M.P. 191–194° C.

*Analysis.*—Calcd. for $C_{14}H_{21}N_4O_5$ (percent): C, 51.7; H, 6.5; N, 17.2. Found (percent): C, 51.42; H, 6.33; N, 17.13.

Diethyl (2,2-diethoxyethyl)-(1-methylbutyl)-malonate Ic

Sodium hydride (50% suspension in oil, 8.8 g., 0.183 mol) was washed with dry benzene and suspended in 80 ml. dry dimethylformamide under dry nitrogen. To this suspension was added dropwise diethyl (1-methylbutyl)-malonate (44.0 g., 0.191 mol), while the temperature was maintained at 40–50°.

When the addition was complete and no more hydrogen was evolved, bromoacetaldehyde diethylacetal (45.2 g., 0.229 mol) was added and the mixture was heated at 123° for 30 hours with stirring under dry nitrogen. The mixture was then concentrated in vacuo, cooled to 15°, and diluted with 50 ml. of water. The water solution was extracted with ether (3× 100 ml.), the combined extracts dried over magnesium sulfate and concentrated in vacuo. The residual light yellow oil was distilled to give 29.9 g. (46%) of Ic, B.P. 102–105/0.05 mm. Hg.

5-(1-methylbutyl)-5-(formylmethyl)-barbituric acid IIIc

The malonic ester Ic (11.85 g., 0.0345 mol) and 2.62 g. of urea (0.044 mol) was added to a solution of sodium (1.83 g., 0.0795 mol) in 49 ml. dry ethanol under dry nitrogen and 37 ml. was gradually distilled off over 2 hours. The temperature of the reaction mixture rose to 95° during this distillation. The reaction mixture was then stirred at 90° for 6 hours and at room temperature for another 15 hours. After cooling to 10°, ice water was added and the solution was extracted with ether (2× 10 ml.). The combined ether extracts were washed with a little water and the combined water phase was brought to pH 2.1 by adding 6 N HCl, whereupon an oil separated. The water phase was then extracted with chloroform (4× 100 ml.) and the extracts dried over magnesium sulfate and evaporated in vacuo to give a colorless oil which crystallized upon scratching. Drying over $P_2O_5$ gave 8.78 g. (81%) of the acetal IIc, M.P. 63–69°.

The acetal IIc (5.0 g., 0.0159 mol) was refluxed for 1 hour in 48 ml. 0.067 N HCl. After cooling slowly to 0° the solution deposited white crystals.

Yield: 2.6 g. (68%) of the aldehyde IIIc, M.P. 128–132°. A sample recrystallized twice from 0.1 N HCl had M.P. 161–162 (softening at 145°).

*Analysis.*—Calcd. for $C_{11}H_{16}N_2O_4$ (percent): C, 54.99; H, 6.71; N, 11.66. Found (percent): C, 54.78; H, 6.93; N, 11.48.

5-(1-methylbutyl)-5-(1,3-dioxy-4,4,5,5-tetramethyl-4,5-dihydro-2-imidazomethyl)-barbituric acid IVc The aldehyde IIIc (3.0 g., .0125 mol) was mixed with 2,3-bis-hydroxylamino-2,3-dimethylbutane (2.32 g., 0.0156 mol) in 325 ml. benzene and stirred for 3 days at room temperature. The benzene solution was then evaporated in vacuo and the residue dissolved (in 100 ml. ethyl acetate). After drying and with magnesium sulfate and evaporation in vacuo 4.40 g. (95%) of pink crystal were obtained. 1.0 g. (0.00271 mol) of this crude adduct was stirred in 250 ml. .1 N sodium hydroxide with sodium periodate (0.87 g., 0.00271 mol) at 0° for 8 min. The deep red solution was then brought to pH 7.0 by adding 1 N hydrochloric acid and extracted with chloroform (4× 100 ml.). After addition of another 10 ml. hydrochloric acid, the water phase was again extracted with 100 ml. chloroform. The combined chloroform solutions were dried over magnesium sulfate, filtered and evaporated in vacuo. The residue was chromatographed on silica with dry ether. The product appeared as a strong red band which was collected. After concentration of this fraction and cooling, red crystals precipitated.

Yield: 0.418 g. (40%) of IVc, M.P. 188–191°.

*Analysis.*—Calcd. for $C_{17}H_{27}N_4O_5$ (percent): C, 55.60; H, 7.35; N, 15.26. Found (percent): C, 55.80; H, 7.24; N, 15.17.

The next sequence of experimental work utilizes the reaction scheme as follows to make the product VIII of this invention:

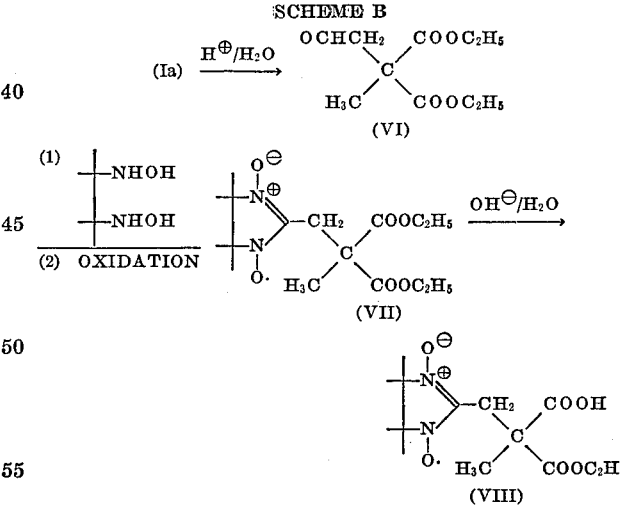

Diethyl methyl-(1,3-dioxy-1,1,5,5-tetramethyl-4,5-dihydro-2-imidazomethyl)-malonate VII The malonic ester Ia (4.0 g., 0.0138 mol) was refluxed in 20 ml. 0.2 N hydrochloric acid for 3 min. The reaction mixture was then cooled to room temperature and extracted with ether (3× 25 ml.). After evaporation of the ether and residual colorless oil was dissolved in 100 ml. benzene followed by addition of 2.04 g. (0.0138 mol) of 2,3-bis-hydroxylamine-2,3-dimethylbutane. This mixture was stirred for 45 min. Lead dioxide (20.0 g.) was then added with some cooling and the mixture was stirred for another 8 min. The deep red reaction mixture was filtered through Celite and evaporated to dryness in vacuo. The resulting red oil was chromatographed on silica with ether. The red fraction was collected and evaporated in vacuo to yield red crystals of the diester radical VII. Recrystallization from petroleum ether yielded 1.60 g. (33%) of VII, M.P. 70–71°.

*Analysis.*—Calcd. for $C_{16}H_{27}N_2O_6$ (percent): C, 55.9; H, 7.87; N, 8.16. Found (percent): C, 55.84; H, 7.81; N, 8.30.

Methyl-1(1,3-dioxy-4,4,5,5-tetramethyl-4,5-dihydro-2-imidazomethyl)-malonic acid monoethyl ester VIII The diester radical VII (0.300 g., 0.087 mol) was stirred in 45 ml. 0.0215 N sodium hydroxide for 18 hours at room temperature. The resulting solution was concentrated in vacuo to 5 ml. while maintaining the temperature below 20°. The remaining 5 ml. of solution was extracted with ether (3× 15 ml.) and the ether extracts washed with little water. The combined water phases were passed through a column containing 5.0 g. of cation exchange resin (Dowex 50W–X8). The column was eluted with 100 ml. water, and the eluate was concentrated in vacuo as before. Two drops of 0.2 N HCl were then added to the remaining water solution followed by contraction with chloroform (3× 50 ml.).

The combined chloroform extracts were dried with magnesium sulfate, filtered and evaporated to dryness in vacuo. The residual red oil, on drying overnight in vacuum over phosphorous pentoxide, yielded red crystals of VIII 0.184 g. (67%), M.P. 60° (gas evolution at about 90°). The crystals of VIII were very hydroscopic but could be handled under dry nitrogen. Absorption maxima were observed in the IR spectrum at $_\nu$KBr 1135, 1173, 1240, 1290 (max.), 1370, 1445, 1600 (broad), 1721, 2980 (m.) and 3440 (m. broad). The mass spectrum showed no molecular ion but an ion at m/e 27 (m.—44) was observed.

The next experimental work utilizes the reaction scheme as follows to make the product XII of this invention.

SCHEME C

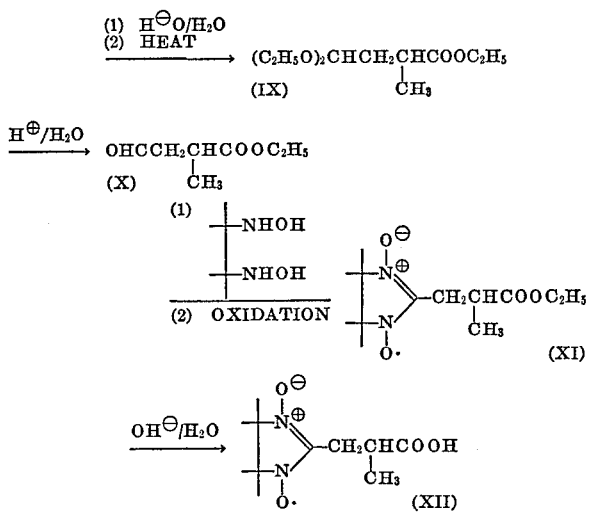

Ethyl 3-(1,3-dioxy-4,4,5,5-tetramethyl-4,5-dihydro-2-imidazole)-2-methylpropionate XI The aldehyde ester X (0.5 g., 0.00347 mol) was stirred with 2,3-bis-hydroxylamino-2,3-dimethylbutane (0.51 g., 0.00347 mol) in 50 ml. benzene for 90 min. at room temperature. The reaction mixture was then cooled to 10°, lead dioxide (6.0 g.) was added and the mixture stirred 10 min. The deep red reaction mixture was filtered through Celite and evaporated to dryness in vacuo. The resulting red oil was chromatographed twice on silica with ether to give 0.425 g. (45%) of the radical XI as a red oil which did not crystallize.

*Analysis.*—Calcd. for $C_{13}H_{23}N_2O_4$ (percent): C, 57.6; H, 8.49; N, 10.33. Found (percent): C, 57.44; H, 8.57; N, 10.27.

3-(1,3-dioxy-4,4,5,5-tetramethyl-4,5-dihydro-2-imidazole)-2-methylpropionic acid XII The radical XI (0.133 g., 0.000491 mol) was stirred in 43 ml. 0.0116 N sodium hydroxide for 5 hours, followed by addition of 0.3 ml. of 4.5 N sodium hydroxide and stirring for another 20 min. The reaction mixture was brought to pH=4.0 by adding 1 N hydrochloric acid and extracted with chloroform (4× 100 ml.). The combined chloroform phase was dried with magnesium sulfate, filtered and evaporated to dryness in vacuo to give a red oil. This oil was chromatographed twice on silica with a 3:2 mixture of methanol-ether. On recrystallization from ether-petroleum ether the red crystalline product melted at about 190° d. (41 mg., 34%).

The following experimental work utilizes the reaction scheme as follows to make the product XIV of this invention:

SCHENE D

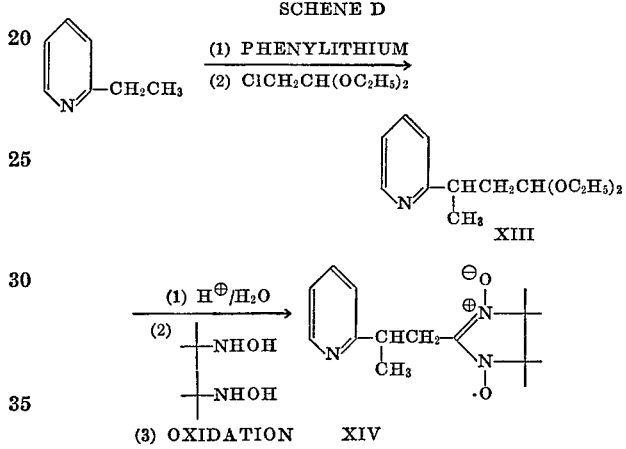

2-(2-pyridyl)-propionaldehyde diethylacetal XIII

A solution of 2-ethylpyridine (13.9 g., 0.13 mol) in 50 ml. of dry ether was added dropwise during 15 min. to a solution of phenyllithium in benzene (60 ml., 2 moles), with stirring under dry nitrogen. This mixture was refluxed for 30 min. and chloroacetaldehyde diethylacetal (9.91 g., 0.0647 mol) was then added with continued heating for 5 hours followed by stirring at room temperature for 12 hours. The brown reaction mixture was then poured over ice (50 g.), whereupon a brown oil separated. The water phase was extracted with ether (3× 100 ml.) and the combined ether phases dried over potassium carbonate and evaporated in vacuo. The residual brown oil gave on distillation the pyridylacetal XIII, B.P. 83–85°/0.05 mm. Hg, 7.0 g. (49%).

*Analysis.*—Calcd. for $C_{13}H_{21}NO_2$ (percent): C, 69.92; H, 9.48; N, 6.27. Found (percent): C, 69.95; H, 9.28; N, 6.27.

2-[2-(α-pyridyl)propyl]-1,3-dioxy-4,4,5,5-tetramethyl-4,5-dihydroimidazole XIV

The acetal XIII (2.0 g., 0.00896 mol) was refluxed in 29 ml. of 0.031 N hydrochloric acid. After 15 min. the solution became clear and was then cooled to room temperature and made alkaline with 1 N sodium hydroxide. An oil separated and the water phase was extracted with ether (3× 50 ml.). The combined ether extracts were dried with potassium carbonate and evaporated in vacuo. To the resulting colorless oil was added a solution of 2,3 - bis - hydroxylamino-2,3-dimethylbutane (1.33 g., 0.00896 mol) in 50 ml. ether. This mixture was stirred for 2 hours at room temperature, and then evaporated to dryness in vacuo. The resulting oil was dissolved in 50 ml. of benzene and stirred with lead dioxide (13.3 g.) for 10 min. at room temperature. The mixture was then filtered over Celite, evaporated to dryness in vacuo and chromatographed over silica with a 1:9:10 mixture of methanol-ethyl acetate-benzene. The deep red fraction containing the radical was evaporated to dryness, and recrystallized from ether-petroleum-ether to give 0.97 g. (39%) of the pyridyl radical XIV, deep red crystals, M.P. 113–116°.

*Analysis.*—Calcd. for $C_{15}H_{22}N_3O_2$ (percent): C, 65.2; H, 7.97; N, 15.21. Found (percent): C, 65.36; H, 7.71; N, 15.33.

The imino nitroxide may be prepared either directly from the 1,3-dihydroxydiazole or indirectly from the nitronylnitroxide. The method of choice will depend upon the particular groups at the beta carbon atom or asymmetric center. The imino nitroxide may be prepared from the 1,3-dihydroxydiazole by the use of sodium nitrite, acid and dimethylformamide as solvent. Alternatively, the nitronylnitroxide may be reduced by using a trialkylphosphite or other method disclosed in the aforementioned co-pending application.

To illustrate the utility of the new radicals of this invention, attention is directed to the accompanying drawings. The radical shown in FIG. 1 was selected and made up in a $10^{-3}$ M stock solution. Equal portions of this solution were added to each of several buffer solutions so as to obtain solutions of different pH's that were approximately $10^{-4}$ M in the radical. Electron spin resonance spectra were obtained with the buffer solutions and these are shown in FIGS. 2 to 12. FIGS. 2 to 12 illustrate one of the five multiplets of each spectrum. The pH of each buffer is indicated in the figures. Distinct differences are observed in the spectra of each of the buffer solutions that were within the ±1.0 pH unit of the pH corresponding to the pKa of the radical indicator.

Given an unknown solution with a pH close to the pKa of 4.40 of the radical illustrated, a suitable amount of the radical is added thereto and its ESR spectrum obtained. Comparison with the known spectra such as those shown in the drawings provides a direct estimate of the unknown pH to within the 0.1 unit. Where the pH of the unknown is very close to the pK of the indicator, estimates to within 0.01 pH unit are possible.

If the spectrum of the unknown corresponds to the spectrum of a known buffer solution that is outside the ±1.0 pH range, only a crude estimate of the pH is possible. If more precise results are required, a different indicator having a pK more closely corresponding to the pH of the unknown is then selected and the comparison with the known spectra repeated. Several trials may be required to achieve optimum results.

Although the foregoing invention has been described in some detail by way of illustration for purposes of clarity of understanding, it will be apparent to one skilled in this art that certain changes and modifications may be practiced within the spirit of this invention as limited only by the scope of the appended claims.

What is claimed is:

1. A method for determining the acidity of an unknown solution including the steps of: adding to said unknown solution an organic free radical, containing an acidic or basic group, said free radical being chemically linked through a methylene group to a carbon atom, the degree of asymmetry about said carbon atom changing with acidity by the gain or loss of a proton by said acidic or basic group, and establishing the ESR spectrum of the unknown solution containing said organic free radical for comparison with the ESR spectrum of a standard to thereby determine the acidity of said unknown solution.

2. A method according to claim 1 wherein said solution is aqueous and the acidity is determined as pH.

3. A method according to claim 1, wherein said organic free radical has an α-imino nitroxide or α-nitronyl nitroxide, wherein the nitrogen atoms are bonded to carbon atoms whose remaining valence are bonded solely to carbon atoms and wherein the carbon atom intermediate the two nitrogen atoms is bonded to a methylene group which is bonded to a group of the formula:

and X, Y and Z represent at least 2 separate organic groups, at least one of which has at least one acidic or basic substituent, which gains or loses a proton with change in acidity of the medium; X, Y and Z being so selected that the degree of asymmetry about C* changes with the gain or loss of a proton by said acidic or basic group.

4. A method in accordance with claim 3, wherein X, Y and Z are selected so that there is symmetry about C* at selected acidities, but asymmetry at other acidities.

5. A method in accordance with claim 3, wherein X, Y and Z are selected so that the acidic or basic group(s) causing the change in the degree of asymmetry about C* with change in acidity is capable of orientation within not more than about 6 angstroms from the methylene group.

References Cited

UNITED STATES PATENTS

| | | | |
|---|---|---|---|
| 3,453,288 | 7/1969 | McConnell | 23—230 R |
| 3,467,582 | 9/1969 | Petersen | 23—230 R |

OTHER REFERENCES

K. M. Sancier, J. Phys. Chem., 67 (7), 1438–42 (1963).

MORRIS O. WOLK, Primary Examiner

S. MARANTZ, Assistant Examiner

U.S. Cl. X.R.

260—257, 309.6; 250—49.5 AE